Patented Nov. 16, 1937

2,099,004

UNITED STATES PATENT OFFICE 2,099,004

MANUFACTURE OF MATERIALS CONTAINING PIGMENTS

Henry Dreyfus, London, England

No Drawing. Application June 17, 1933, Serial No. 676,336. In Great Britain July 4, 1932

11 Claims. (Cl. 106—40)

This invention relates to the manufacture of pigments and other substances, and also to the production of natural textile materials and of artificial filaments, threads, yarns, ribbons, films and similar products, having a reduced, subdued or modified lustre or exhibiting other effects due to the presence therein of such substances.

The incorporation of organic or inorganic pigmenting materials in artificial products for the purpose of modifying their lustre or producing colouring or other effects therein is of great industrial importance, but the processes which have hitherto been known have suffered from certain defects. For example, it is well known that certain inorganic pigments used for delustring purposes tend to cut the guides or other portions of apparatus with which the materials come into contact and are therefore unsatisfactory from this point of view.

I have now discovered that organic or inorganic pigmenting materials may be prepared in a form in which they are very suitable for incorporation in natural textile materials and in artificial filaments, threads, yarns, ribbons, films and the like for the production of delustred, coloured or other effects, by heating them under reduced pressure or in a vacuum at suitable temperatures. In this manner materials may be obtained having improved properties, e. g. a reduced tendency to cut the guides, or of a more suitable particle size or more easily brought to the required particle size. Such a process is of particular value when it is desired to dry pigments which have been prepared, for example, by precipitation from aqueous media, and will therefore be described with particular reference thereto, but it may also be applied for other purposes, as for example when it is desired to obtain an oxide by dehydration of a hydroxide, as in the production of alumina from aluminium hydroxide, or an oxide from a carbonate or to dry colloidal or finely divided metals.

When the materials are prepared by precipitation methods, dilute solutions of the reacting compounds are in general preferably used, in order to favour the formation of the materials in a finely divided form.

The process of the invention may be applied to any suitable pigments or similar substances, but is of particular value in connection with inorganic pigments. Among white pigments which may be thus treated may be mentioned the sulphates and carbonates of barium, calcium and lead, titanium dioxide, zinc oxide, alumina, stannic oxide, stannic phosphate, antimony trioxide, barium phosphate, zinc and magnesium carbonates, and barium and calcium borates, and also such organic compounds as starches, sugars and the like and derivatives thereof, and organic compounds of high melting point such as are employed according to U. S. application S. No. 473,781 filed 7th August, 1930, whilst coloured compounds include barium and lead chromates, cadmium sulphide, Prussian blue, cobalt yellow, chrome yellow, iron red, chrome red, blue verditer, Schnitzer's green, manganese brown, Vandyke brown, and organic pigments such as the vat dyestuffs. The invention may also be applied to the treatment of phosphorescent materials such as zinc sulphide used in U. S. application S. No. 473,780 filed 7th August, 1930.

The temperatures and pressures employed in carrying out the present invention will of course depend upon the materials which are being treated and the reaction which takes place, for example whether the process is concerned merely with the removal of water or other liquid from a substance which has been precipitated from solution, or whether it involves a chemical decomposition, as, for example, in the formation of aluminium oxide from aluminium hydroxide. In general however, temperatures of from 200° to 300° up to 500° C. are suitable for inorganic pigments, in conjunction with pressures which may be of the order of 500 to 400 mms. or lower, for example, 200 to 100 mms. or even substantially a total vacuum. Organic compounds will in general require treatment at lower temperatures e. g. 50–100 to 200°.

The apparatus employed may consist of a closed vessel into which the substance to be dried or otherwise treated is placed, the vessel being connected with a suitable pump for reducing the pressure in the interior and maintaining it at the required value. In the case of a vessel of this description it may be desirable to fit some type of stirring apparatus to maintain the substance in motion and assist in the expulsion of the water vapour or other gaseous substance. Or again the material may be arranged on trays contained in an oven maintained under reduced pressure. Heating may be effected, if desired, by application from outside the vessel, or by means of steam pipes passing through the vessel. Care must be taken however that no steam leakage from the pipes occurs within the vessel, and thus reduces the degree of vacuum therein. Another type of apparatus which may be employed comprises a long tube containing a screw conveyor or endless band. When a screw conveyor is employed the material may be introduced at one end of the tube and gradually moved along by means of the screw, while in the case of the use of a band conveyor it is placed on the band and travels along with it. Again, the material may be introduced into an inclined tube revolving about its longitudinal axis, the material travelling down the tube under the action of gravity. Apparatus of the continuous band, screw conveyor or revolving tube type may be adapted so that the process of heating under reduced pressure is substantially continuous, the material being introduced at one end and discharged at the other. The temperature along the tube may be uniform or it may vary, for example in the case of materials which are being treated in order to remove water, so that the liquid is substantially removed at a relatively low temperature and the temperature is then raised in order to complete the operation. A temperature gradient of this nature is of assistance in preventing the material from caking or agglomerating. The same principle may of course be applied to the treatment of materials in closed vessels by varying the temperature during different stages of the treatment.

Advantageously the chamber may contain, or be connected with a further chamber containing a dehydrating agent or absorbing material, such as calcium chloride, or activated charcoal, and in cases where the treatment is not carried out in substantially complete vacuum, a very small current of dry air or other gas may be passed through the chamber, the pressure in the chamber nevertheless remaining below atmospheric. Advantageously the current of gas may be allowed to pass through the materials under treatment.

Any suitable means of heating may be employed, for example, the vessel may be immersed in an oil bath or a bath of molten metal, or direct heating may be used.

According to a modification of the invention the materials may be heated under reduced pressure in the presence of suitable organic compounds, which are preferably liquid under the conditions of heating. Thus the materials may be treated in suspension in organic liquids, which are preferably immiscible with water, or in the presence of such liquids in vapour form. Advantageously the materials are treated in the presence of a heavy oil or similar high boiling substance, e. g. heavy white mineral oil or olive, castor or other vegetable oil. Examples of other suitable substances which may be employed are given in my U. S. application S. No. 676,335 filed on even date herewith, to which reference is made broadly. Again, the materials may be heated under reduced pressure in the presence of liquids which are to some extent miscible with water, e. g. ethylene and trimethylene glycols, aromatic and alicyclic alcohols such as benzyl alcohol, cyclo-hexanol and esters of poly hydroxy alcohols such as di- and tri-acetin. If desired a mixture of two or even more organic compounds may be used, and when drying pigments in the presence of the organic compounds in vapour form, it is advantageous to employ a mixture of two liquids one of lower boiling point having an affinity for water and the other of higher boiling point. A small current of air or other gas may be allowed to pass in contact with the materials under treatment, and in this case the current of air or other gas may also serve to carry the organic substance, for example as vapour, into contact with the materials under treatment. Preferably the organic compounds employed are such that they need not be entirely removed from the pigmenting materials in the subsequent incorporation of the substances into textile materials, and the organic liquid may be selected, moreover, such that its presence may even be advantageous. Thus, the organic compounds employed may be plasticizers or may be dispersing agents. In general organic liquids employed as dispersion media will have high boiling points in order that at the temperature and reduced pressure employed there is not too great a tendency for the organic liquid to evaporate.

As has been mentioned above, the process of the present invention is not limited to the removal of water from pigments, and it may be applied also to the removal of any other undesired liquids or relatively volatile substances which may be present. It may also be employed in the production of pigments by the decomposition of hydroxides or other metallic compounds, and in this case a relatively elevated temperature is usually necessary.

The substances obtained according to the present invention may be subjected to any suitable further treatment, as, for example, a grinding process to reduce, if necessary, their particle sizes. Such grinding process may be combined with a process for incorporating the substances with the spinning solution.

In general, particle sizes of below .006 mm. and particularly of from .003 to .0005 mm. have been found suitable though larger or smaller sizes may be employed if desired.

The incorporation of the pigments or other substances obtained according to the present invention may be carried out in any suitable manner. For example, they may be worked up with the base of the spinning solution itself or with a portion of the solution or solvent thereof and incorporated in the main bulk of the solution, or they may be worked up with any other suitable medium preferably one which is miscible with the spinning solution, and then incorporated therein in the form of a dispersion in such medium. Stabilizing colloids and/or dispersing agents may be employed, for example Turkey red oil.

The spinning solutions prepared as above may be spun by wet or dry spinning processes in order to obtain products having a reduced, subdued or modified lustre or showing colour or other effects, for example metallic effects due to the presence therein of finely divided or colloidal metals.

Alternatively the pigments obtained according to the present invention may be incorporated in natural textile materials or in the artificial materials after their formation. For example the materials, preferably after a treatment with swelling agents, which for example, in the case of cellulose acetate may be acetic acid, formic acid or acetone in aqueous solution, and in the case of cellulosic materials may be solutions of zinc chloride, thiocyanates and the like may be passed through or immersed in a bath containing a dispersion of the pigments. Such dispersion may be aqueous or organic, and if desired the dispersion medium may itself form a swelling agent for the cellulose derivative to be treated.

The pigments obtained according to the present invention may be employed in the treatment of natural textiles, e. g. cotton, wool and natural silk, or of artificial materials of the regenerated cellulose type, such as are obtained by the viscose, cuprammonium and nitrocellulose processes. They are however of particular value in the treatment of artificial materials containing organic derivatives of cellulose, for example cellulose esters or mixed esters such as cellulose formate, propionate, butyrate and nitroacetate, ethers and mixed ethers of cellulose, e. g. ethyl, propyl, butyl and benzyl cellulose and mixed ether-esters, for example, ethyl cellulose acetate and oxyethyl cellulose acetate. Their use in connection with artificial materials containing cellulose acetate is, moreover, of particular value.

The following examples are given in order to illustrate the invention but it is to be clearly understood that they do not limit it in any way.

*Example 1*

Aluminium hydroxide is precipitated by the addition of ammonia to a dilute solution of aluminium sulphate, preferably in the presence of a small amount of ammonium chloride. The gelatinous precipitate is freed from mother liquor by washing with water, and then freed as far as possible from water by means of a filter press. The material is then charged into a chamber provided with stirring mechanism. The pressure in the chamber is reduced to 10–20 cms. mercury and a small current of dry air is allowed to flow through the chamber, retaining the pressure in the chamber, however, at 10–20 cms. mercury. The chamber is then gradually heated to a temperature of 100–200° C. and maintained at that temperature for 1–2 hours. It is desirable that the heating be applied slowly, only a low temperature being employed until the bulk of the contained water is removed.

The dried material is then ground in a ball or colloid mill until the average particle size does not exceed 1–2 microns and is then incorporated in a 25% solution of cellulose acetate in acetone in concentration equal to 2–3% of pigmenting material calculated on the weight of the cellulose acetate. Filaments and threads prepared from this spinning solution exhibit a pleasantly subdued lustre.

*Example 2*

Titanic acid, prepared by precipitation from boiling titanium sulphate solution, is washed with water and freed as far as possible from water by means of a filter press. The material is then fed through a hopper into a tube maintained at a pressure of 10–20 cms. at a temperature of about 300–400° C. The material is moved along the tube by means of a screw conveyor and leaves the tube through a suitable valve mechanism adapted substantially to maintain the low pressure in the tube.

The so-treated pigmenting material is ground in a ball or colloid mill until the average particle size is about 1–2 microns and is then incorporated in an acetone solution of cellulose acetate in proportion of 2–3% of pigmenting material calculated on the weight of the cellulose acetate. The filaments or threads spun from this solution exhibit a subdued lustre and a reduced tendency to cut the guides and knitting needles during subsequent textile operations.

What I claim and desire to secure by Letters Patent is:—

1. Artificial filaments, threads, ribbons, films and like materials of low abrasive power and containing inorganic pigments which pigments have been heated at 200 to 500° C. under a pressure of less than 50 cms. of mercury.

2. Artificial filaments, threads, ribbons, films and like materials of low abrasive power and containing inorganic pigments which pigments have been produced by heating titanic acid at 200 to 500° C. under a pressure of less than 50 cms. of mercury.

3. Artificial filaments, threads, ribbons, films and like materials of low abrasive power and containing an organic derivative of cellulose and inorganic pigments which pigments have been heated at 200 to 500° C. under a pressure of less than 50 cms. mercury.

4. Artificial filaments, threads, ribbons, films and like materials of low abrasive power and comprising cellulose acetate, which materials contain an inorganic pigment of particle size between 1 and 2 microns, said pigment having been prepared by heating a titanic acid at 200 to 500° C. under a pressure of 10 to 20 cms. mercury.

5. Artificial filaments, threads, ribbons, films and like materials of low abrasive power and containing inorganic pigments, which pigments have been heated at 200 to 500° C. under a pressure of less than 50 cms. of mercury in the presence of an organic substance.

6. Artificial filaments, threads, ribbons, films and like materials of low abrasive power and containing inorganic pigments, which pigments have been heated at 200 to 500° C. under a pressure of less than 50 cms. of mercury in the presence of a substantially non-volatile organic substance.

7. A spinning solution for the manufacture of artificial filaments, threads, yarns, ribbons, films and like materials which comprises a suitable base for the materials, a solvent for such base and fine particles of an inorganic pigment which has been heated at 200 to 500° C. under a pressure of less than 50 cms. of mercury.

8. A spinning solution for the manufacture of artificial filaments, threads, yarns, ribbons, films and like materials by dry spinning processes which comprises an organic derivative of cellulose, a volatile organic solvent therefor and fine particles of an inorganic pigment which has been heated at 200 to 500° C. under a pressure of less than 50 cms. of mercury.

9. A spinning solution for the manufacture of artificial filaments, threads, yarns, ribbons, films and like materials by dry spinning processes which comprises cellulose acetate, a volatile organic solvent therefor and fine particles of an inorganic pigment which has been heated at 200 to 500° C. under a pressure of less than 50 cms. of mercury.

10. A spinning solution for the manufacture of artificial filaments, threads, yarns, ribbons, films and like materials which comprises a suitable base for the materials, a solvent for such base and fine particles of titanic acid which have been heated at 200 to 500° C. under a pressure of less than 50 cms. of mercury.

11. A spinning solution for the manufacture of artificial filaments, threads, yarns, ribbons, films and like materials by dry spinning processes which comprises cellulose acetate, a volatile organic solvent therefor and fine particles of titanic acid which have been heated at 200 to 500° C. under a pressure of less than 50 cms. of mercury.

HENRY DREYFUS.